E. H. DONAHOE.
WASTE PIPE FITTING.
APPLICATION FILED JULY 15, 1914.
1,282,053.
Patented Oct. 22, 1918.
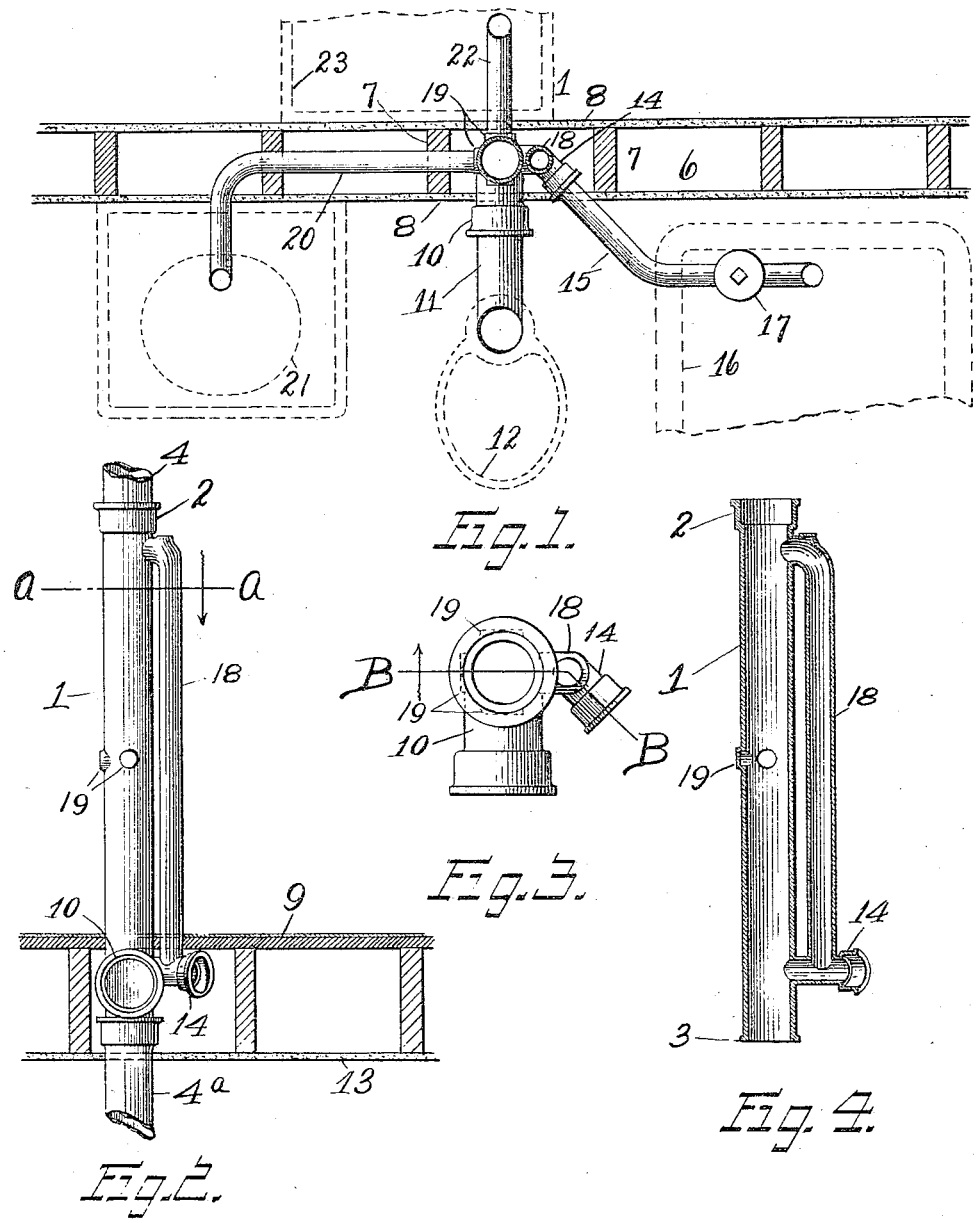

UNITED STATES PATENT OFFICE.

EDWARD H. DONAHOE, OF PEORIA, ILLINOIS.

WASTE-PIPE FITTING.

1,282,053.  Specification of Letters Patent.  Patented Oct. 22, 1918.

Application filed July 15, 1914. Serial No. 851,062.

*To all whom it may concern:*

Be it known that I, EDWARD H. DONAHOE, a citizen of the United States, residing at Peoria, in the county of Peoria and State of Illinois, have invented certain new and useful Improvements in Waste-Pipe Fittings, of which the following is a specification.

This invention has reference more particularly to a waste pipe fitting which is designed to avoid siphonage.

The object of my invention is to provide a fitting which has a number of inlets, with means to prevent siphonage of the inlets which has heretofore been experienced, and which has a tendency to drain the traps.

A further object is the provision of a one piece fitting which is furnished with inlets for closet, bath, bowl, and other fixtures as required, and is provided with integral means for counteracting the siphonage created by the closet inlet so as to prevent draining of the traps of the tub, bowl, etc.

A further object is the provision of a fitting with the fixture inlets and with anti-siphon, means constructed in a compact manner so that the fitting will readily be contained within the ordinary partition.

My invention also embraces other objects which will appear from the following specification taken in connection with the drawing and which are particularly pointed out in the claims.

In the accompanying drawing, Figure 1 is a top sectional view of the fitting taken on the line A—A of Fig. 2 and shows in dotted lines, a bath tub, closet, bowl and sink which is connected to the fitting; Fig. 2 is a side view of the fitting; Fig. 3 an enlarged top view of the fitting; and Fig. 4 a vertical sectional view taken on the line B—B of Fig. 3.

This fitting consists of a section of vent pipe, 1 which is provided at its upper end with a hub 2, adapted to receive and connect with another section of pipe 4, and is constructed at its lower end as at 3 so as to fit within the hub of the pipe 4ᴬ, through which the waste water passes and is discharged.

This fitting is adapted to occupy an upright position and fit within the ordinary partition 6, intermediate of the studding 7 and the wall surfaces 8 so as to be entirely concealed. The lower end of the fitting extends below the flooring 9 and is provided at its lower end between the floor 9 and ceiling 13, with a large inlet 10, which is designed to be connected by means of pipe 11, with the closet, indicated by dotted lines at 12 in Fig. 1.

Immediately adjacent the closet inlet 10 is an inlet 14 which is connected by means of the pipe 15 to the tub indicated by dotted lines at 16 in Fig. 1, said pipe 15 being provided with the usual trap 17. The tub 16, similarly to the closet 12 is mounted directly on the floor 9 and the drain pipe 15 is concealed between the flooring 9 and the ceiling 13, and consequently is connected with the drain pipe 1, approximately on a horizontal plane with the closet inlet 10. As a consequence the rush of water through the inlet 10 and past the inlet 14 creates a suction in the pipe 15 which unless counteracted will drain the trap 17 and permit waste gases to pass through the pipe 15 from the waste pipe. To prevent this suction I have provided a vent pipe 18, which is preferably cast integral with the fitting 1, and connected at its lower end to the inlet 14, and at its upper end to the fitting 1, immediately below the hub 2. This vent pipe 18 is preferably built very close to the fitting 1, so as to be as compact as possible and permit the placing of same in the wall and between the studding 7. Thus it will be observed that the suction created by the rush of water into the inlet 10 and past the mouth of the inlet 14 will be relieved by the air by-pass 18, which will permit air to pass from the upper portion of the fitting 1 down into the inlet 14 immediately adjacent its connection with the fitting 1.

Somewhat above the floor 9, at the proper height for connection of same thereto the fitting 1 is provided preferably at 90 degree distances around the pipe with bosses 19, which may be drilled and tapped to provide connection of the waste pipe 20, from the bowl 21 thereto, and the waste pipe 22 from the sink 23 thereto or the waste pipes from any other fixture that may be desired.

What I claim is:

1. In a device of the class described, a plumbing fitting comprising a main drain section, a closet drain communicating with the lower end thereof, a second inlet member communicating with said section at a point removed but within the vertical area and within siphoning distance of the closet drain, a vent member disposed with relation to the closet and second drain to vent the same, the upper end of said vent exhausting into said main drain section and facilities for the connection of one or more waste pipes directly with said main section intermediate the closet and second waste entrances and the point where the vent member communicates with the main section.

2. A plumbing fitting comprising a combined waste and vent section having a main inlet connection at the lower end thereof, a second inlet connection substantially within the vertical area of the main inlet, a vent member communicating with said second inlet and with the waste and vent section and related to said main and second inlet to ventilate the same and an inlet communicating directly with the combined waste and vent section at a point intermediate the main and second inlets and the point of exhaust of said vent.

3. In a combination waste and vent fitting, the combination of a stack, a main inlet member communicating with and at an angular relation to the lower end of the stack, a secondary inlet member communicating with the stack within siphoning distance of a main inlet, a vent duct communicating at its lower end with the said secondary inlet member and communicating at its upper end with the stack at a distance above the siphoning area of the main inlet connection, and an inlet member connected directly to the stack intermediate of the upper and lower ends of said vent duct so as to discharge directly into the stack, intermediate of the ends of said vent duct.

In testimony whereof I have affixed my signature in presence of two witnesses.

EDWARD H. DONAHOE.

Witnesses:
  H. V. GIBSON,
  I. D. TEFFT.

Copies of this patent may be obtained for five cents each, by addressing the "Commissioner of Patents, Washington, D. C."